(12) United States Patent
Bussell

(10) Patent No.: US 10,899,403 B2
(45) Date of Patent: Jan. 26, 2021

(54) STORAGE MOUNT FOR HITCH EQUIPMENT

(71) Applicant: HITCHPORT, LLC, Palm City, FL (US)

(72) Inventor: Gary E. Bussell, Palm City, FL (US)

(73) Assignee: Hitchport, LLC, Palm City, FL (US)

(*) Notice: Subject to any disclaimer, the term of this patent is extended or adjusted under 35 U.S.C. 154(b) by 0 days.

(21) Appl. No.: 16/224,908

(22) Filed: Dec. 19, 2018

(65) Prior Publication Data
US 2019/0185082 A1 Jun. 20, 2019

Related U.S. Application Data

(60) Provisional application No. 62/607,351, filed on Dec. 19, 2017.

(51) Int. Cl.
*B62D 63/08* (2006.01)
*B60D 1/58* (2006.01)

(52) U.S. Cl.
CPC ............ *B62D 63/08* (2013.01); *B60D 1/58* (2013.01)

(58) Field of Classification Search
CPC .................................. B62D 63/08; B60D 1/58
USPC .................................. 224/401, 519; 280/495
See application file for complete search history.

(56) References Cited

U.S. PATENT DOCUMENTS

| | | | | |
|---|---|---|---|---|
| 3,520,556 A * | 7/1970 | Warner | ................. | B60D 1/345 280/406.2 |
| 3,552,771 A * | 1/1971 | Hendricks | .............. | B60D 1/065 280/406.2 |
| 3,600,004 A * | 8/1971 | Newkirk | ................. | B60D 1/345 280/156 |
| 4,046,398 A * | 9/1977 | Dunwoody | .............. | B60D 1/46 280/415.1 |
| 4,662,647 A * | 5/1987 | Calvert | .................... | B60D 1/07 280/490.1 |
| 5,139,295 A * | 8/1992 | Escobedo | ................. | B60R 3/00 182/90 |
| 6,089,431 A * | 7/2000 | Heyworth | .............. | B60D 1/075 224/521 |
| 6,874,804 B2 * | 4/2005 | Reese | ...................... | B60D 1/06 224/520 |
| D653,592 S * | 2/2012 | Brown | ......................... | D12/162 |
| 9,004,521 B2 * | 4/2015 | Dringenberg | ............ | B60D 1/52 280/495 |
| 10,183,536 B2 * | 1/2019 | McCoy | ................... | B60D 1/247 |
| 2006/0186638 A1 * | 8/2006 | Varner | ...................... | B60R 9/06 280/506 |
| 2006/0220347 A1 * | 10/2006 | Witchey | ................... | B60D 1/06 280/507 |
| 2007/0228693 A1 * | 10/2007 | Witchey | ................... | B60D 1/07 280/416.1 |

(Continued)

*Primary Examiner* — Nathan J Newhouse
*Assistant Examiner* — Lester L Vanterpool
(74) *Attorney, Agent, or Firm* — McHale & Slavin, P.A.

(57) ABSTRACT

A hitch equipment storage mount. The hitch equipment storage mount is sized and shaped to secure to a portion of hitch equipment, such as a trailer hitch or trailer hitch tongue, and comprises a main body. The main body is sized and shaped to secure to, for example, the trailer hitch tongue. The main body is configured to receive and hold, for example, a hitch bar or spring bar used in a hitch system and comprises two arm-like appendages separated by a space and terminating in a bottom portion.

11 Claims, 9 Drawing Sheets

(56) References Cited

U.S. PATENT DOCUMENTS

| | | | |
|---|---|---|---|
| 2008/0143078 A1* | 6/2008 | McCoy | B60D 1/34 |
| | | | 280/406.1 |
| 2011/0011675 A1* | 1/2011 | Ebbenga | B60P 3/10 |
| | | | 182/106 |
| 2011/0156369 A1* | 6/2011 | Schroder | B60D 1/52 |
| | | | 280/491.1 |
| 2012/0049484 A1* | 3/2012 | Brass | B60D 1/60 |
| | | | 280/507 |
| 2015/0028562 A1* | 1/2015 | Hill | B62D 63/08 |
| | | | 280/400 |
| 2016/0001711 A1* | 1/2016 | Hughes | B60R 9/06 |
| | | | 224/403 |
| 2017/0158147 A1* | 6/2017 | Harrison | B60D 1/58 |
| 2017/0297390 A1* | 10/2017 | McDevitt | B60D 1/025 |
| 2018/0135795 A1* | 5/2018 | Palmer | B60D 1/52 |

\* cited by examiner

STORAGE MOUNT FOR HITCH EQUIPMENT

CROSS REFERENCE TO RELATED APPLICATIONS

In accordance with 37 C.F.R. 1.76, a claim of priority is included in an Application Data Sheet filed concurrently herewith. Accordingly, the present invention claims priority to U.S. Provisional Patent Application No. 62/607,351 entitled "STORAGE MOUNT FOR HITCH EQUIPMENT" and filed on Dec. 19, 2017. The contents of the above referenced application are incorporated herein by reference in its entirety.

FIELD OF THE INVENTION

The present invention relates to trailer hitches and hitch equipment; and more particularly, to a trailer hitch storage mount.

BACKGROUND OF THE INVENTION

Vehicles such as truck and sport utility vehicles (SUVs) are often modified so they are capable of towing an object. In many cases, the towing vehicles use a hitch and/or hitch receiver. When in use, the hitch can be used to secure an object that needs to be towed to the towing vehicle. When not towing, the hitch should be removed from the hitch receiver. Most often, the hitch is either stored in a garage or other inside area, inside of a car, or within the bed of a truck. If placed inside of the truck's bed, it may roll about the bed when the vehicle is traveling, damaging either the hitch or the bed of the truck. In addition, the hitch may be subject to theft. Storing the hitch inside presents additional problems. Because the hitch is stored in a specific location, i.e. a garage, it may not be accessible when needed should the user be at a remote location. Moreover, hitches can be greasy, causing transfer of the grease to the indoor storage facilities.

Therefore, what is needed in the art is a hitch equipment storage mount which provides easy storage of heavy weight distributing hitch equipment, such as hitch bars, when not in use. A hitch equipment storage mount which provides a user with extra inside storage space and keeps greasy parts outside and off the ground as the hitch equipment is stored on the trailer frame or trailer frame tongue is also needed.

SUMMARY OF THE INVENTION

The present invention relates to a storage mount for storing hitch equipment. The hitch equipment storage mount is sized and shaped to secure to a portion of hitch equipment, such as a trailer frame or trailer tongue, and comprises a main body. The main body is sized and shaped to secure to, for example, the trailer hitch tongue. The main body is configured to receive and hold, for example, a hitch bar or spring bar used in a hitch system, and comprises two arm-like appendages separated by a space and terminating in a bottom portion. The hitch equipment storage mount provides for easy storage of heavy weight distributing hitch bars, or other hitch equipment, when not in use. By storing the hitch bars therein, heavy lifting of hitching equipment from the ground, or in and out of storage compartments, is prevented. The close proximity to the towing vehicle reduces the need to carry heavy hitching equipment from a distance, thereby reducing the risk of personal injury. The hitch equipment storage mount provides users with extra inside storage space and keeps greasy parts outside and off the ground as the equipment is stored on the trailer frame.

Accordingly, it is an objective of the invention to provide a unique storage mount for storing hitch equipment.

It is a further objective of the invention to provide a storage mount for storing hitch equipment outside.

It is yet another objective of the invention to provide a storage mount for storing hitch equipment at the hitch frame.

It is a still further objective of the invention to provide a storage mount for storing hitch equipment at the trailer tongue.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
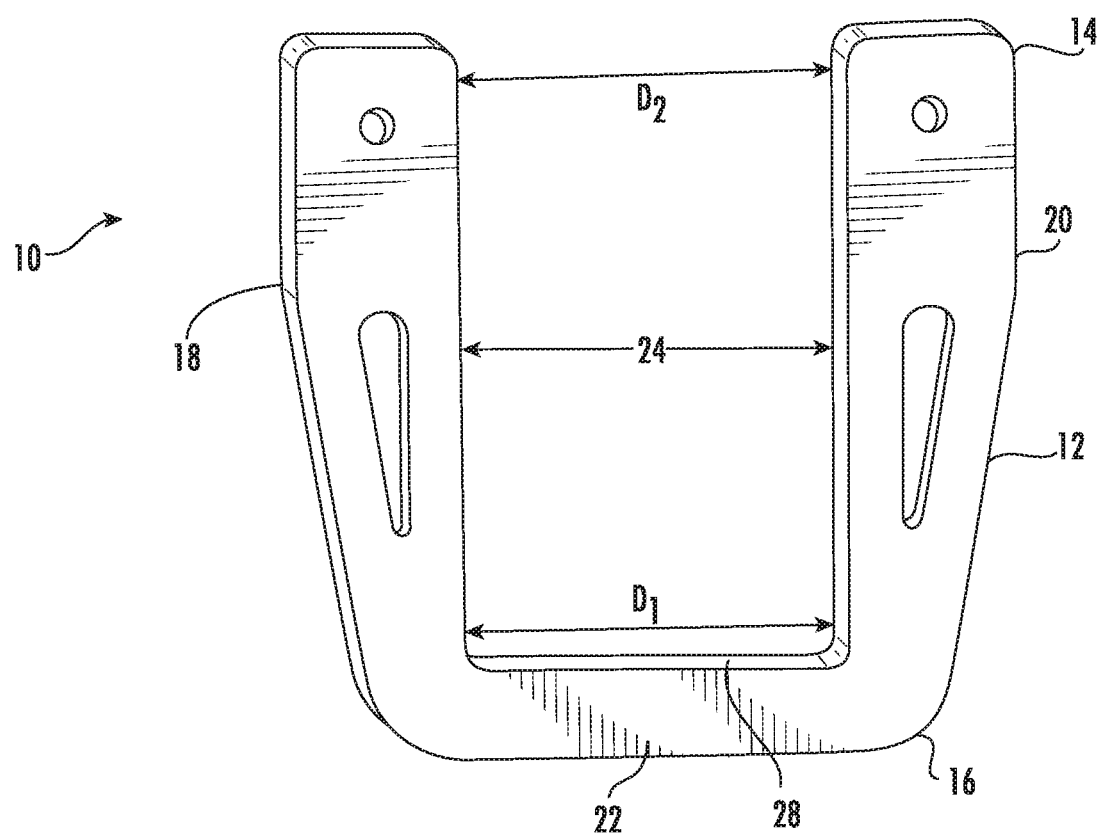
FIG. 1 is a side perspective view of the hitch equipment storage mount.

While the present invention is susceptible of embodiment in various forms, there is shown in the drawings and will hereinafter be described a presently preferred, albeit not limiting, embodiment with the understanding that the present disclosure is to be considered an exemplification of the present invention, and is not intended to limit the invention to the specific embodiments illustrated.

Figure 2:
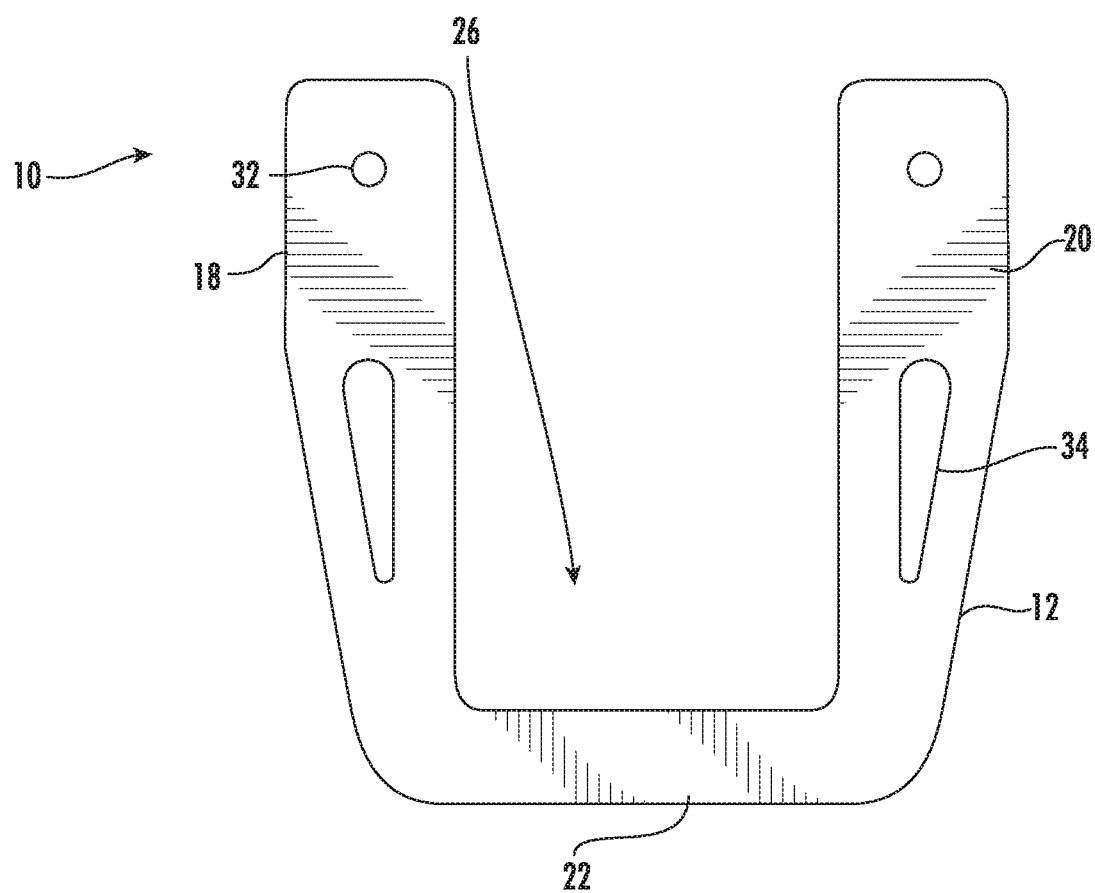
FIG. 2 is a front view of the hitch equipment storage mount.

Referring to FIGS. 1 and 2, an illustrative example of a storage mount, referred to generally as a hitch equipment storage mount 10, is illustrated. The hitch equipment storage mount 10 is sized and shaped to secure to a portion of hitch equipment, such as a trailer frame or trailer hitch tongue. The hitch equipment storage mount 10 comprises a main body 12 sized and shaped to secure to, for example, the trailer hitch tongue and receive and hold, for example, a hitch bar or spring bar used in a hitch system. The main body 12 comprises a top end 14 configured to secure to the trailer hitch tongue and an opposing bottom end 16. As illustrated in FIGS. 1 and 2, the main body assumes a generally U-shaped configuration with a pair of arms, left arm 18 and right arm 20, each extending upwardly and away from a base portion 22. The left arm 18 is separated from the right arm 20 by a space 24.

The space 24 forms the interior region 26 of the hitch equipment storage mount 10. The distance between the left arm 18 and the right arm 20 should be a sufficient length to receive and hold one or more types of hitch equipment, such as a hitch bar or spring bar. In an illustrative embodiment, the distance D2 between the left arm 18 and right arm 20 at or near the top end 14 of the main body 12 is the same as or smaller than the distance D1 between the left arm 18 and right arm 20 at or near the bottom end 16 of the main body 12 or where the left arm 18 and right arm 20 terminate to form the base portion 22. This configuration allows a hitch bar that is inserted into the interior region 26, between the left arm 18 and right arm 20, to move or pivot against the planar top surface 28 of the base portion 22.

Positioned at the upper end of the left arm 18 and the right arm 20 is a securing member receiving member, illustrated herein as a mounting opening 32. The opening 32 is sized and shaped to receive a securing member, such as a screw, thereby providing a mechanism for the hitch equipment storage mount 10 to be secured to the hitch equipment. Both the left arm 18 and the right arm 20 also contain an alignment guide, illustrated herein as an elongated slotted cut-out portion 34. The elongated slotted cut-out portion 34 is shown assuming a teardrop like shape. The teardrop shaped cut-out portions 34 are preferably positioned so the edge of the cutout closest to the mounting openings 32 provide a visual guide for positioning the hitch equipment storage mount 10 during installation. The wide end of the teardrop shaped cut-out portion 34 is aligned with the upper or lower horizontal plane of the frame (see frame described below), perpendicular to the hitch equipment storage mount 10.

Figure 3:
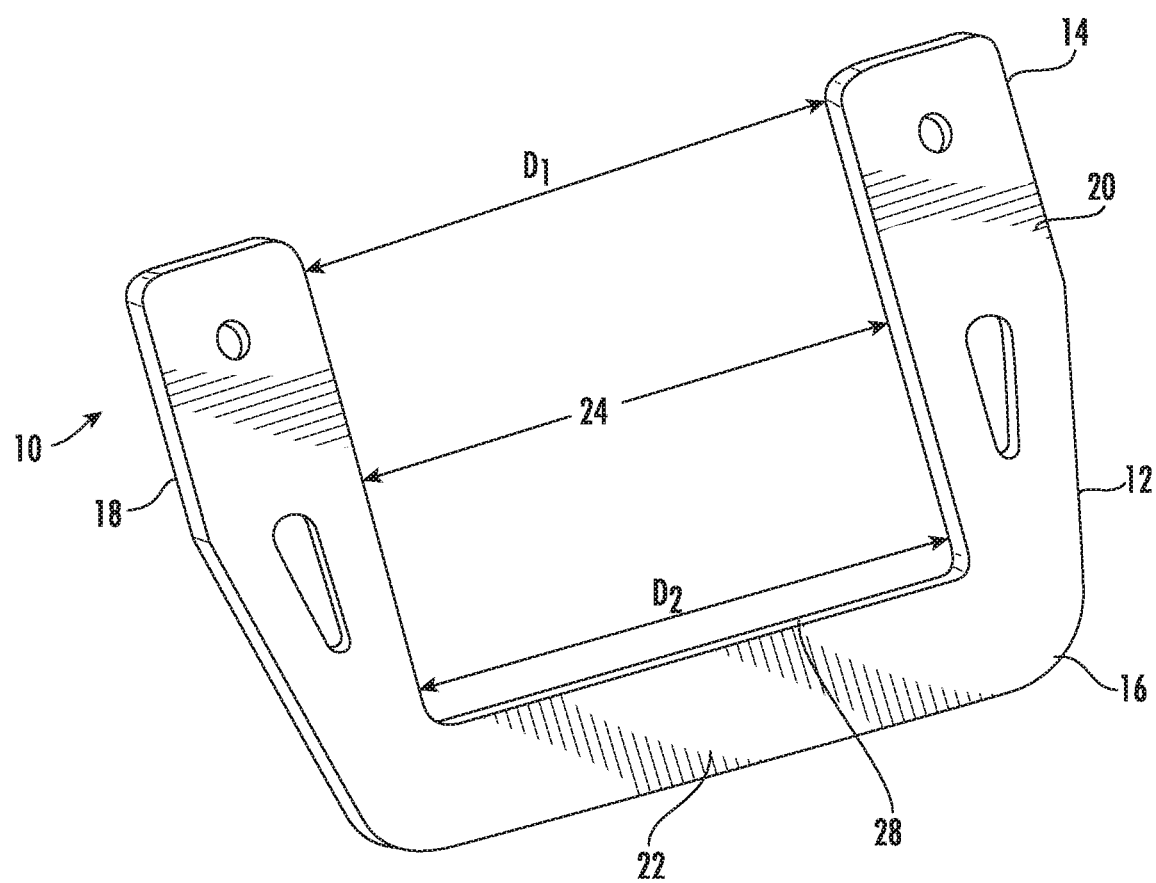
FIG. 3 is a side perspective view of an alternative embodiment of the hitch equipment storage mount.
Figure 4:
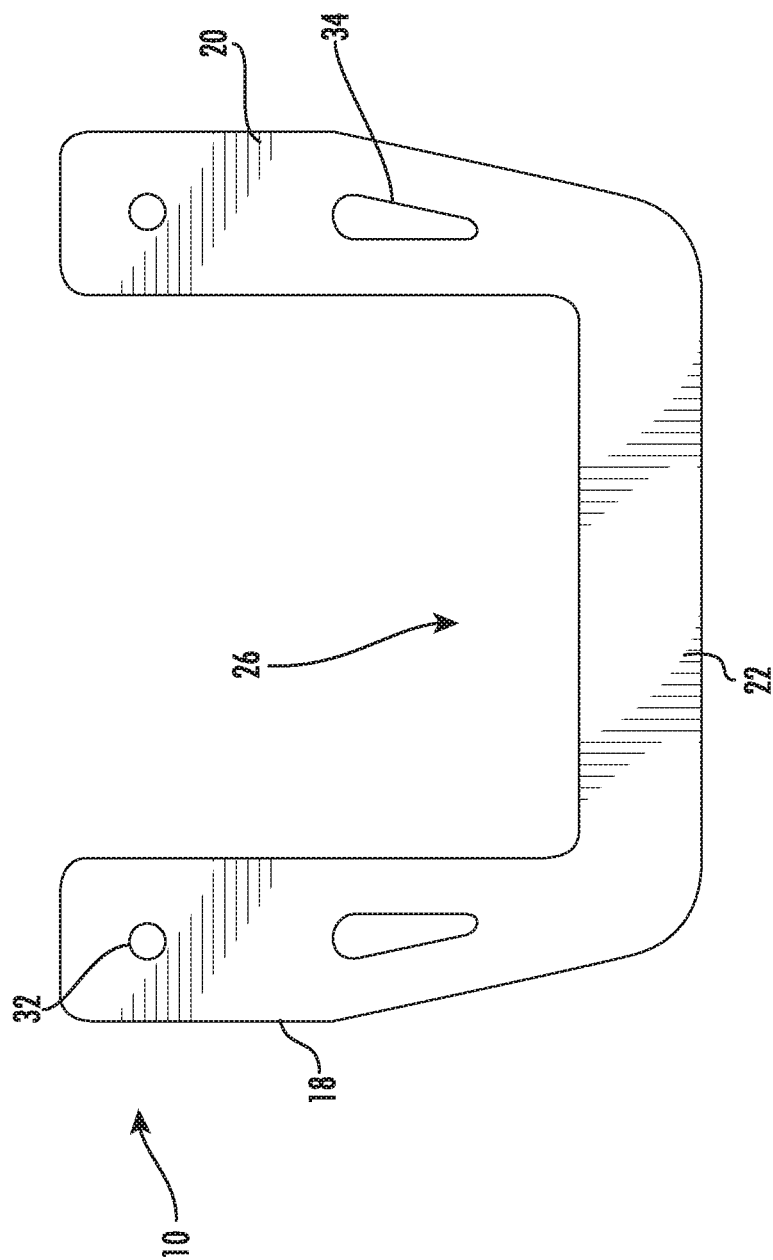
FIG. 4 is a front view of the hitch equipment storage mount shown in FIG. 3.

FIG. 3 and FIG. 4 illustrate an embodiment of the hitch equipment storage mount 10 which is configured to store hitch equipment spring bars, such as round spring bars, trunnion spring bars, or square spring bars. The hitch equipment storage mount 10 illustrated in FIGS. 3 and 4 have all the same components as described previously, differing mainly in the length of the left arm 18 and the right arm 20 (being shorter) and the space 24 or distance between the left arm 18 and the right arm 20 (being larger).

Figure 5:
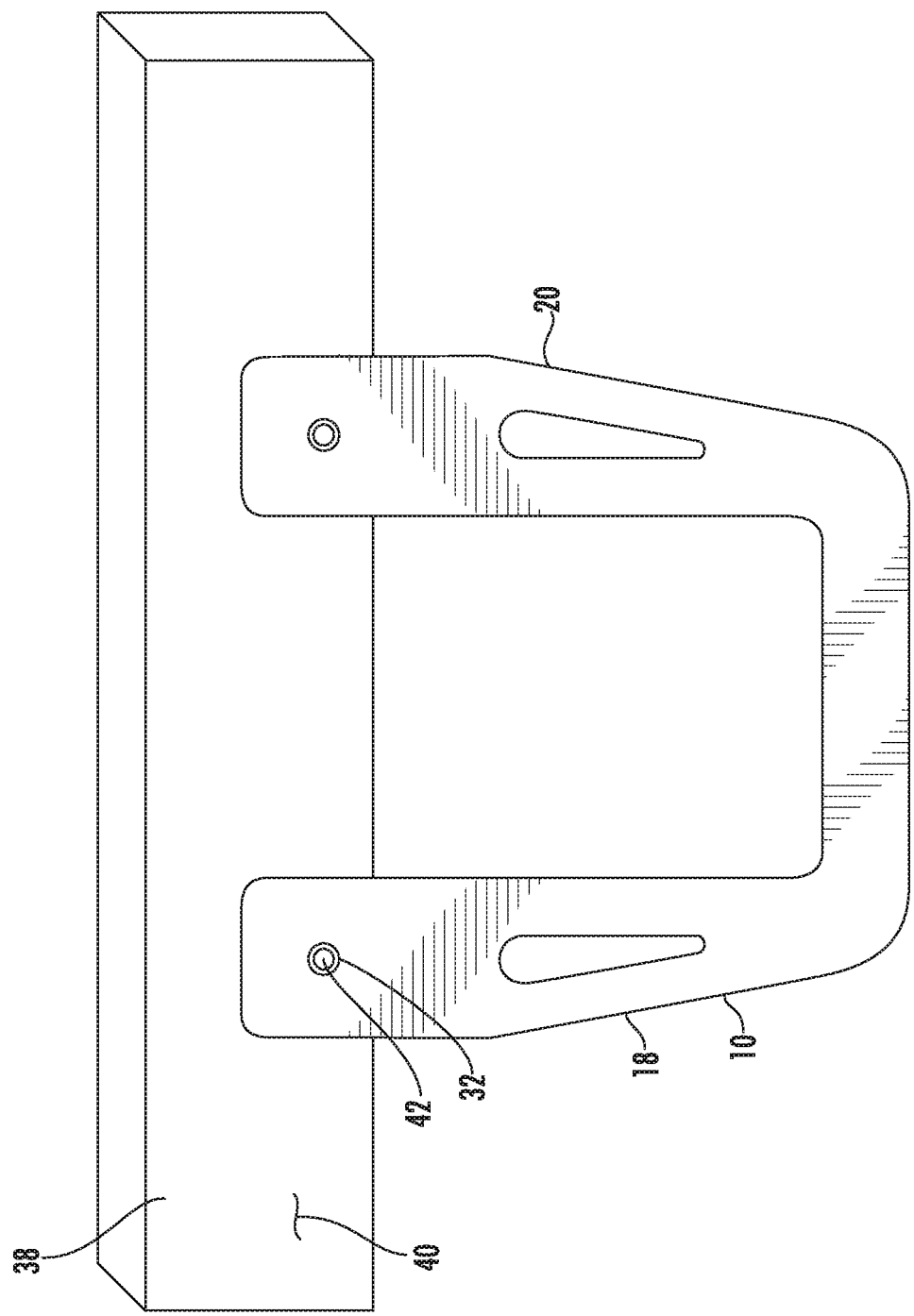
FIG. 5 illustrates the hitch equipment storage mount secured to a portion of a trailer tongue frame, in which hitch equipment is stored below the frame.
Figure 6:
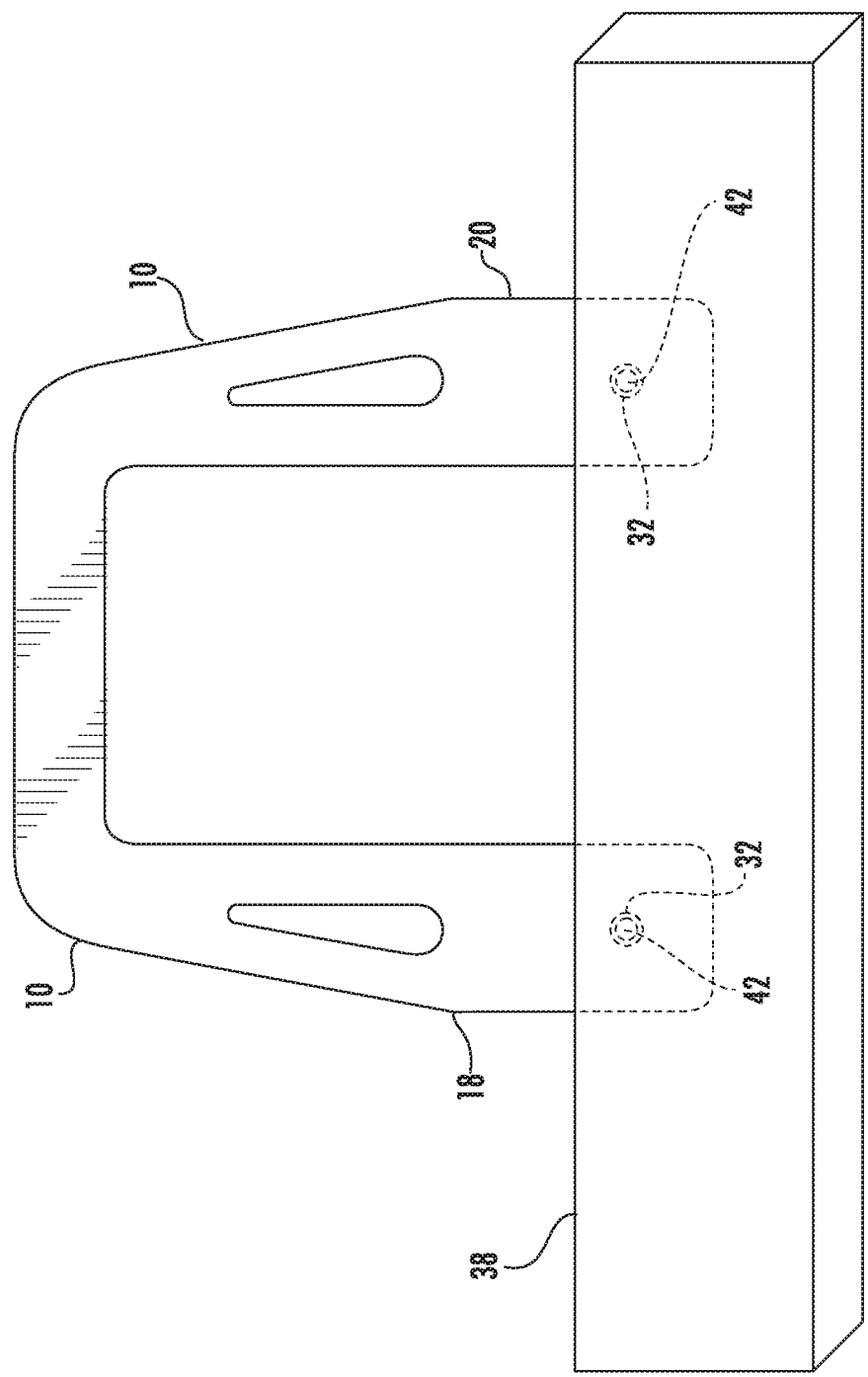
FIG. 6 illustrates the hitch equipment storage mount secured to a portion of a trailer tongue frame, in which hitch equipment is stored above the frame.

Referring to FIG. 5, the hitch equipment storage mount 10 is shown secured to a portion of a hitch related equipment frame 38, such as a trailer tongue frame. The hitch equipment storage mount 10 is shown secured to the outer facing surface 40 of the frame 38 in order to stow hitch equipment, such as a hitch bar, below the frame. The hitch equipment storage mount 10 is secured to the frame 38 by securing screws into mounting openings 32 located in the left arm 18 and right arm 20, and securing into the frame. Referring to FIG. 6, the hitch equipment storage mount 10 is shown secured to the outer facing surface 40 of the frame 38 in order to stow hitch equipment, such as a hitch bar, below the frame. The hitch equipment storage mount 10 is secured to the frame 38 by securing screws 42 into openings 32 located in the left arm 18 and right arm 20, and securing into the frame.

Figure 7A:
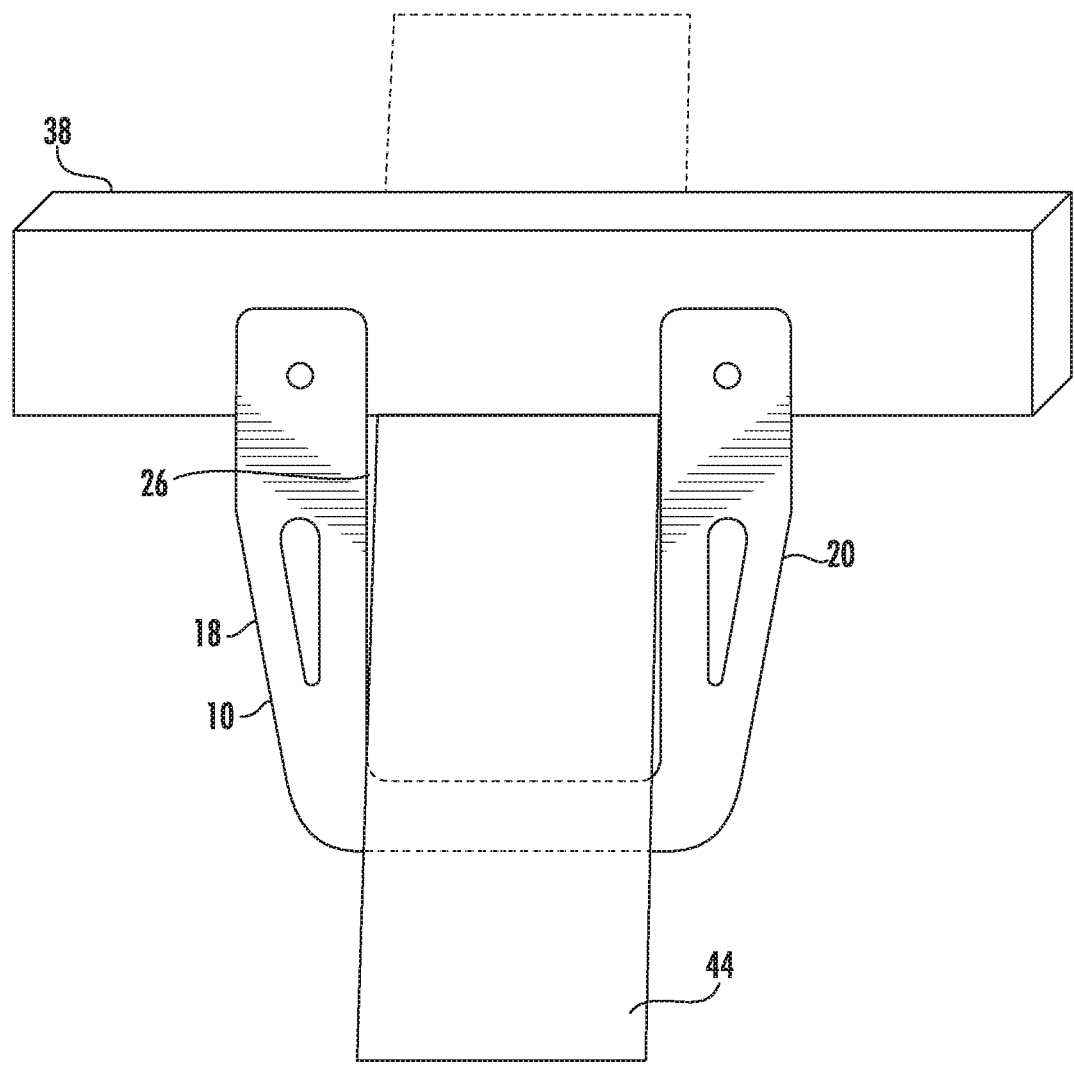
FIGS. 7A-7B illustrate the storage of hitch equipment (hitch bar, FIG. 7A; spring bar, FIG. 7B) within the hitch equipment storage mount.
Figure 7B:
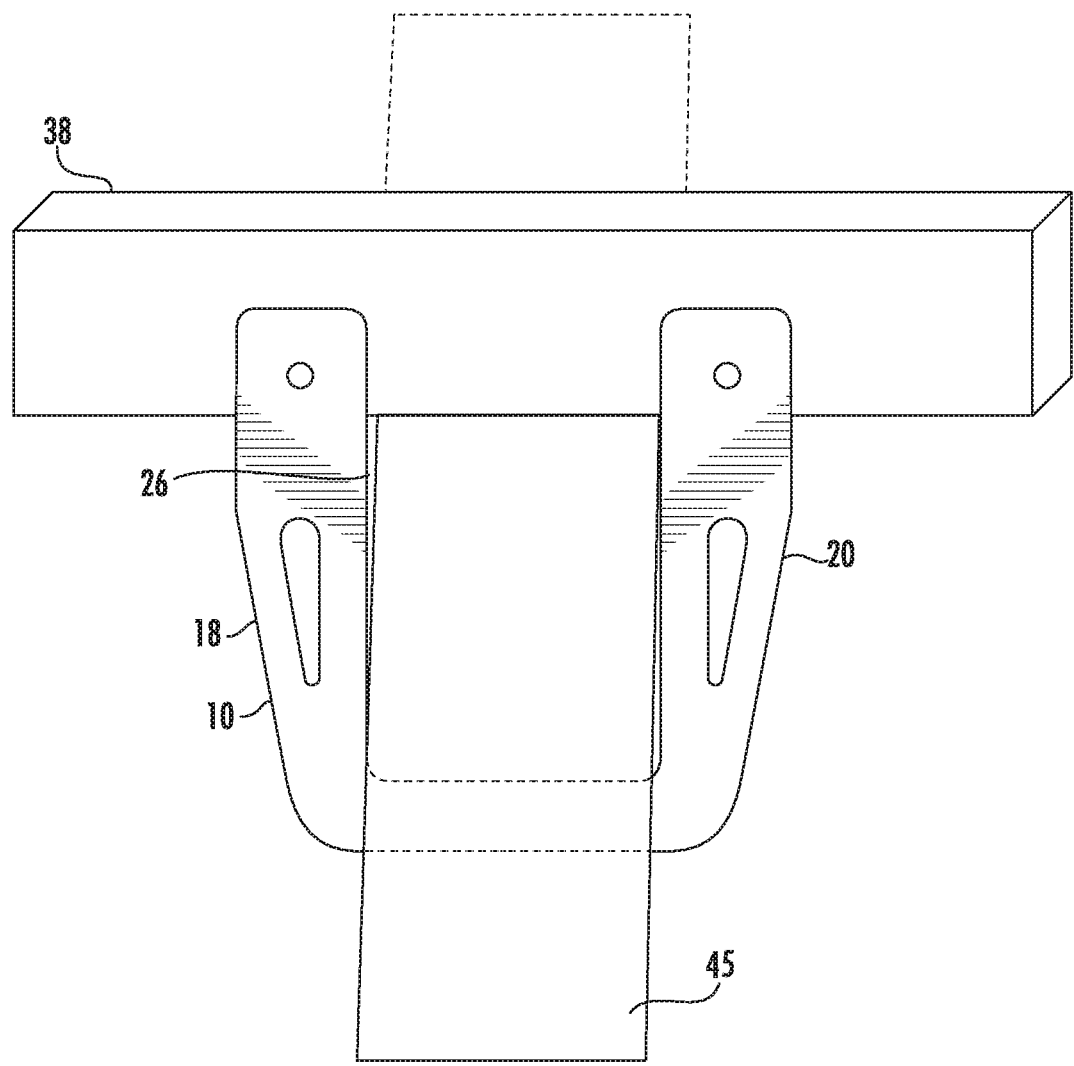
Figure 8:
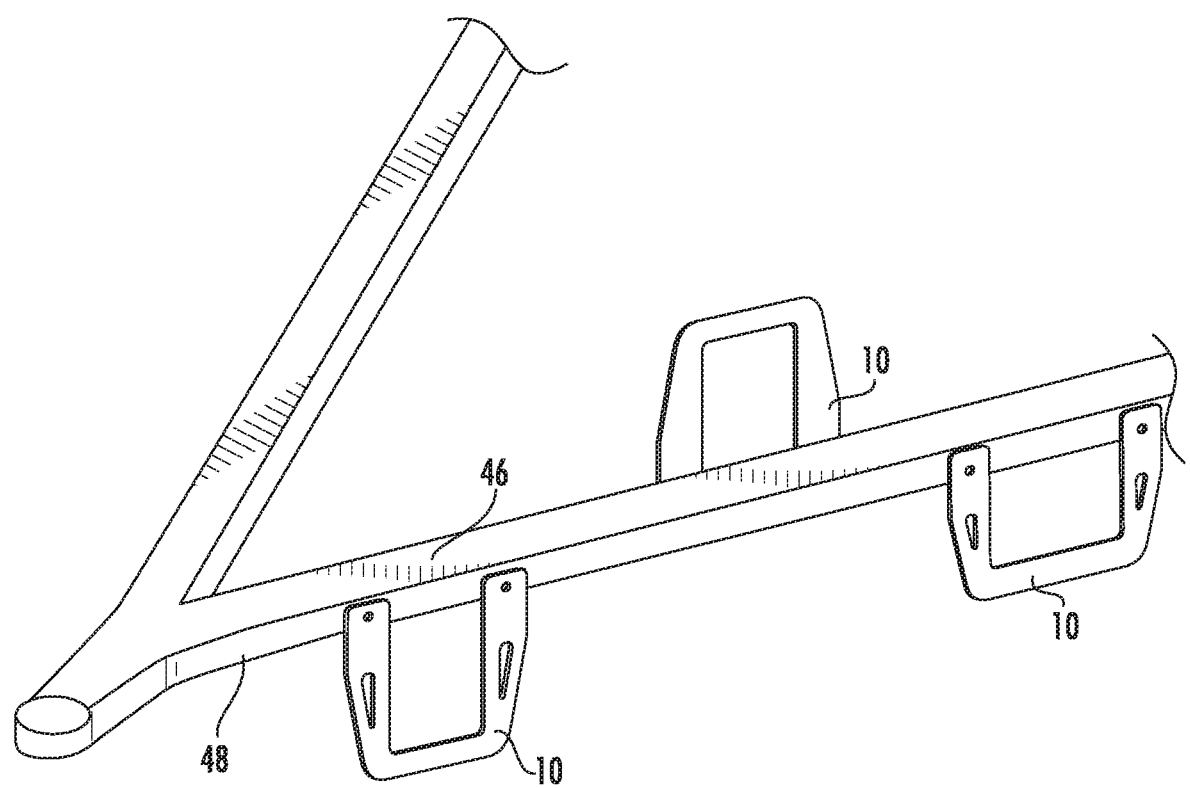
FIG. 8 illustrates a plurality of hitch equipment storage mounts secured along one portion of the trailer tongue frame.

FIGS. 7A-7B illustrate the securing of the hitch equipment, illustrated herein as a hitch bar 44 in FIG. 7A (and spring bar 45 in FIG. 7B). The hitch bar 44 (or spring bar 45) is placed into the interior region 26 of the hitch equipment storage mount 10, positioned between the left arm 18 and right arm 20. Depending on the positioning, a portion of the hitch bar 44 (or spring bar 45 may be cantilevered or simply rested against the frame 38 or the planar top surface 28 of the base portion 22. In this arrangement, the hitch bar 44 (or spring bar 45 can be stored directly to the trailer tongue. Although not shown, a cable lock or padlock can be used to prevent the removal of the hitch bar, providing added security and preventing unlawful unintended removal. FIG. 8 illustrates a plurality of hitch equipment storage mounts 10 secured (shown secured in stow above and stow below orientations) to a frame 46 of a trailer tongue 48.

All patents and publications mentioned in this specification are indicative of the levels of those skilled in the art to which the invention pertains.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A hitch equipment storage mount sized and shaped to secure to a portion of hitch equipment comprising:
a main body having a base portion and two elongated bodies, a first arm and a second arm, extending away from said base portion, wherein said first arm and said second arm are separated by a distance of sufficient length to receive and hold one or more types of hitch equipment, thereby forming a space therebetween, said space forming an interior region of said hitch equipment storage mount, said first arm and said second arm each comprising a mounting opening sized and shaped to receive a securing member and positioned to allow securing of said main body to a single surface of a trailer tongue at two separate positions when secured either above or below, and an alignment guide, said alignment guide being an elongated slotted cut-out portion, wherein, when said main body is secured to said trailer tongue single surface said base portion of said main body is aligned in a parallel orientation relative to said trailer tongue single surface and said first arm and said second arm are aligned in a perpendicular orientation relative to said trailer tongue single surface, and said interior region is enclosed, thus forming a cantilevered support when said one or more types of hitch equipment is inserted into said hitch equipment storage mount main body, wherein when said one or more types of hitch equipment is inserted into and through said hitch equipment storage mount, said trailer tongue frame works in conjunction with said hitch equipment storage mount to allow a first portion of said one or more types of hitch equipment to rest against said trailer tongue frame, thus providing a counter balance as a second portion of said one or more types of hitch equipment rests on said base portion, thereby supporting and maintaining said one or more types of hitch equipment in a secured position within said hitch equipment storage mount.

2. The hitch equipment storage mount according to claim 1 wherein said one or more types of hitch equipment is a hitch bar.

3. The hitch equipment storage mount according to claim 1 wherein said one or more types of hitch equipment is a spring bar.

4. The hitch equipment storage mount according to claim 1 wherein said distance between said first arm and said second arm at or near a top end of said main body is the same as or smaller than a distance between said first arm and said second arm at or near a bottom end of said main body.

5. The hitch equipment storage mount according to claim 1 wherein said base portion includes a planar top surface sized and shaped to allow at least a portion of said hitch equipment inserted between said first arm and said second arm and resting within said interior region to move or pivot.

6. The hitch equipment storage mount according to claim 1 wherein said elongated slotted cut-out portion assumes a teardrop shape, said teardrop shaped cut-out portion is positioned so an edge of said cutout closest to said securing member receiving member provides a visual guide for positioning a hitch equipment storage mount during installation.

7. A method of storing hitch equipment to a trailer tongue using a storage mount comprising:
providing a hitch equipment storage mount comprising a main body having a base portion and two elongated bodies, a first arm and a second arm, extending away from said base portion, wherein said first arm and said second arm are separated by a distance of sufficient length to receive and hold hitch equipment, thereby forming a space therebetween, said space forming an interior region of said hitch equipment storage mount, said first arm and said second arm each comprising a mounting opening sized and shaped to receive a securing member and positioned to allow securing of said main body to a single surface of said trailer tongue at two separate positions wherein when said main body is secured to said trailer tongue single surface, said base portion of said main body is aligned in a parallel orientation relative to said trailer tongue single surface, said first arm and said second arm are aligned in a perpendicular orientation relative to said trailer tongue single surface and said interior region is enclosed, thus forming a cantilevered support when said hitch equipment is inserted into said hitch equipment storage mount main body;
inserting a hitch equipment bar in between and through said first arm and said second arm;
resting said hitch equipment bar within said hitch equipment storage mount interior, wherein at least a portion of said hitch equipment rests on or against said main body base portion and at least a portion of said hitch equipment rests on or against said trailer tongue single surface, wherein said trailer tongue works in conjunction with said hitch equipment storage mount to allow said at least a portion of said hitch equipment resting on or against said trailer tongue single surface to provide a counter balance to said first portion of said hitch equipment resting on or against said base portion, thereby supporting and maintaining said hitch equipment in a secured position within said hitch equipment storage mount.

8. The method of storing hitch equipment using a storage mount according to claim 7, wherein said hitch equipment storage mount is secured to said at least one portion of said single surface in an orientation where said hitch equipment storage mount base is positioned above said at least one portion of said trailer tongue single surface.

9. The method of storing hitch equipment using a storage mount according to claim 7, wherein said hitch equipment storage mount is secured to said at least one portion of said hitch equipment in an orientation where said hitch equipment storage mount base is positioned below said at least one portion of said trailer tongue single surface.

10. The method of storing hitch equipment using a storage mount according to claim 7, wherein said hitch bar equipment is a hitch bar.

11. The method of storing hitch equipment using a storage mount according to claim 7, wherein said hitch bar equipment is a spring bar.

* * * * *